June 6, 1967     B. W. MYLREA, SR., ET AL     3,323,762
AERIAL DELIVERY SYSTEM
Filed March 24, 1965     6 Sheets-Sheet 1
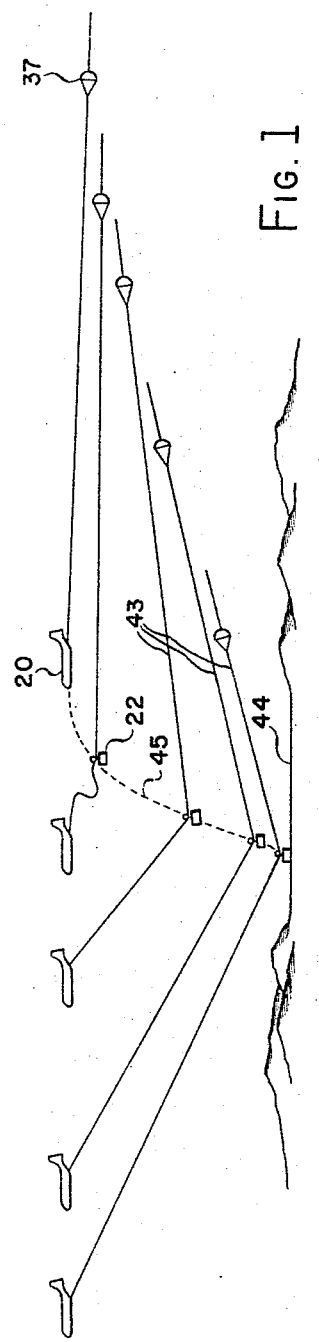
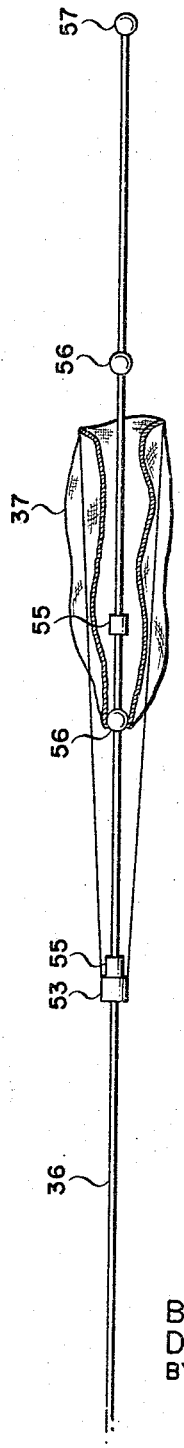
INVENTORS.
BRUCE W. MYLREA, SR.
DON R. SCARBROUGH, SR.
BY
Agent

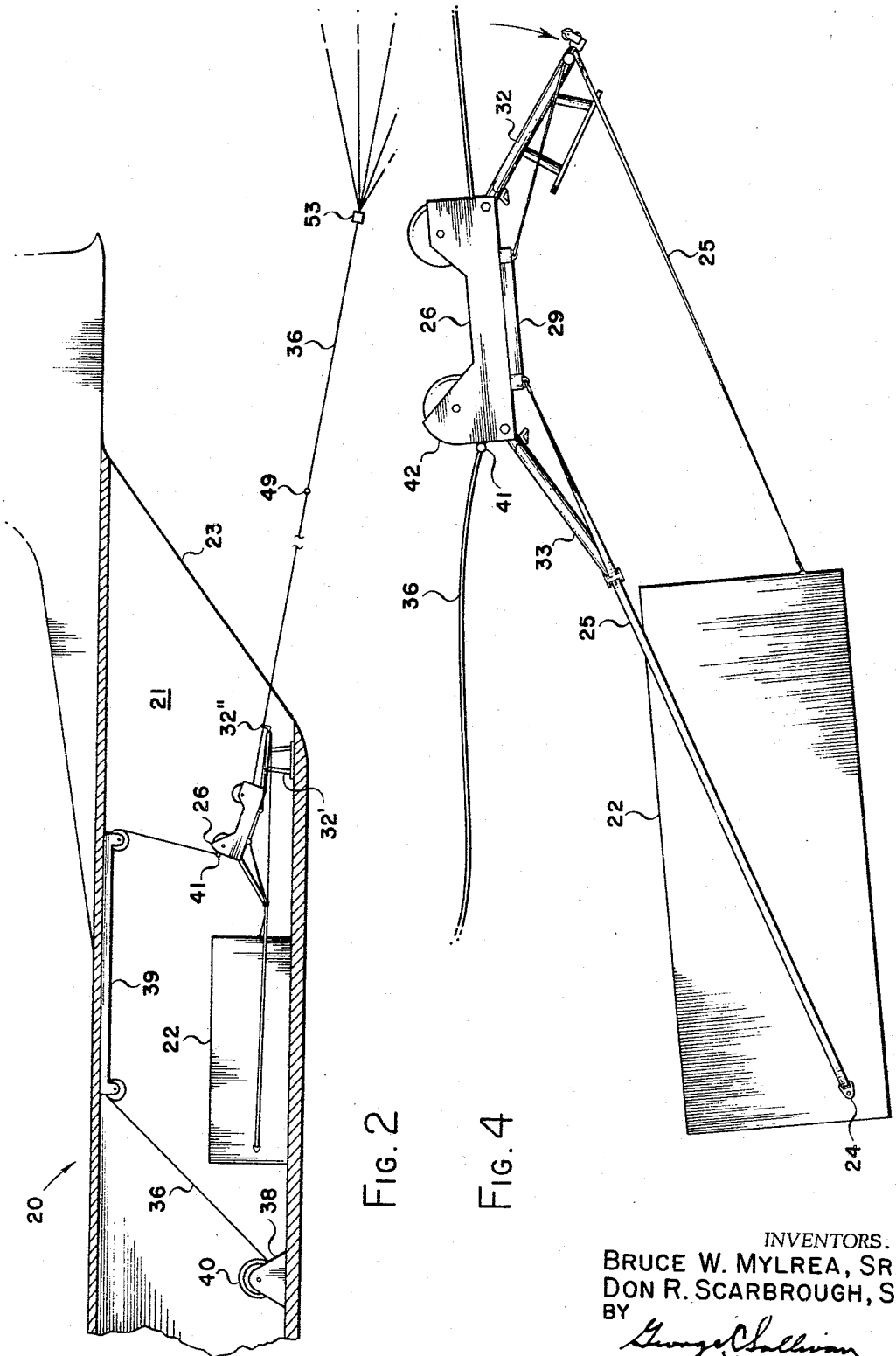

INVENTORS.
BRUCE W. MYLREA, SR.
DON R. SCARBROUGH, SR.
BY
George C. Sullivan
Agent June 6, 1967  B. W. MYLREA, SR., ET AL  3,323,762
AERIAL DELIVERY SYSTEM
Filed March 24, 1965  6 Sheets-Sheet 6
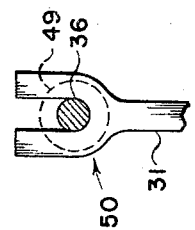
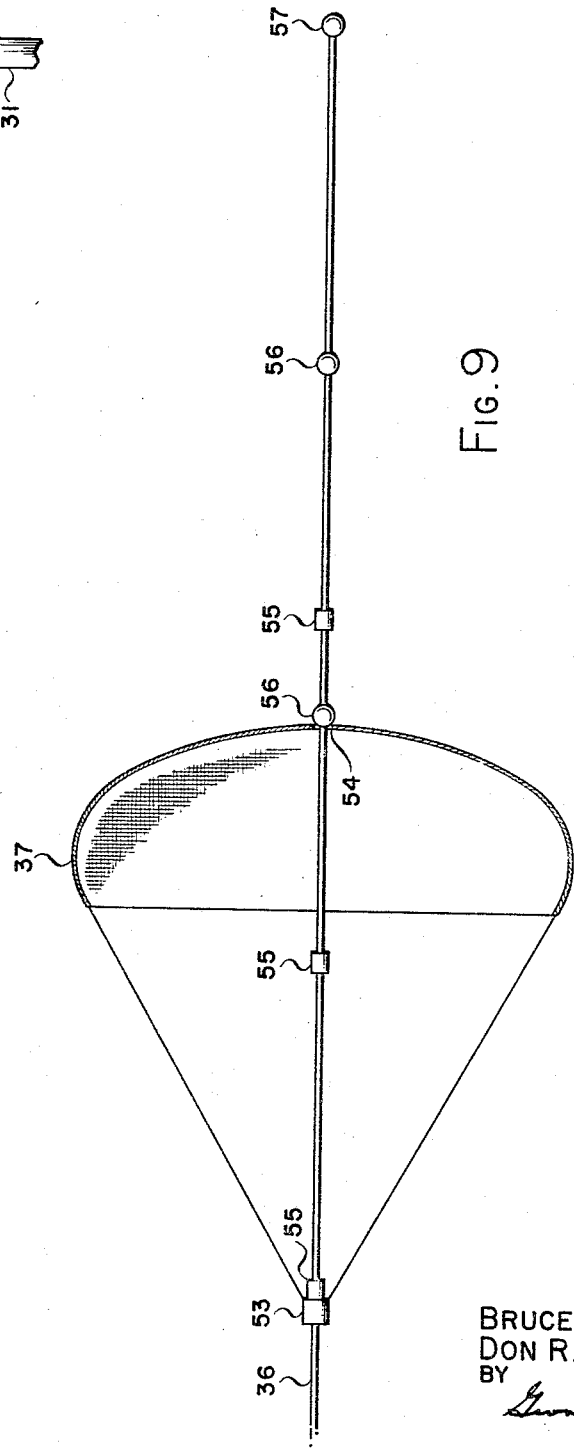
INVENTORS.
BRUCE W. MYLREA, SR.
DON R. SCARBROUGH, SR.
BY
George C. Sullivan
Agent

United States Patent Office 3,323,762
Patented June 6, 1967

3,323,762
AERIAL DELIVERY SYSTEM
Bruce W. Mylrea, Sr., Palo Alto, Calif., and Don R. Scarbrough, Sr., Marietta, Ga., assignors to Lockheed Aircraft Corporation, Burbank, Calif.
Filed Mar. 24, 1965, Ser. No. 442,467
10 Claims. (Cl. 244—138)

This invention relates to aerial delivery systems by which cargo is ejected or dropped from aircraft during flight and delivered intact to a surface target area, and more particularly to such a system capable of so delivering relatively large payloads (loads in excess of 5,000 pounds) with a minimum of preparation of the target area and/or cargo package required.

Helicopters have been generally accepted as the best vehicle for the delivery of cargo or payloads to relatively inaccessible geographical areas or locations. This is the result of a compromise inasmuch as compared with fixed wing aircraft helicopters are slow, short ranged, and payload limited. Current efforts to apply the concept of vertical rising and landing (VTOL) to fixed wing carrier aircraft is aimed toward satisfying this deficiency. With VTOL carriers, substantial energy is expended in decelerating the vehicle, lowering it to the ground, raising it again, and accelerating it back to flight speed. The present invention, therefore, is directed primarily to the delivery of payloads from fixed wing carrier aircraft in flight rather than VTOL carrier aicraft because the energy expended in decelerating and lowering the payload is only a fraction of that for the entire aircraft and the problems involved in vertical takeoff of the aircraft after delivery are eliminated.

In prior or previously proposed systems for achieving aerial delivery of payloads, i.e., vertically delivering payloads from fixed wing aircraft during level flight, such as free drop by parachute, are not only inacurate but also require extensive shock absorbing packaging of the payload to withstand the high impact loads. This is expensive in weight, space, packaging and unpackaging time, and cost. Moreover, these prior systems usually rely on rockets, hydraulic and pneumatic rams, slingshots, and ground-based extraction devices, all of which complicate the problem by additional cost, weight and space requirements imposed on the carrier aircraft, or added equipment delivery problems and its installation on the ground.

In efforts to overcome the foregoing objections to systems based on aerial delivery concepts, the "tethered" airdrop principle has been heretofore developed. As previously developed, this principle envisions the location of a drag-producing device, usually a parachute, between the aircraft and the payload or cargo during the descent wherby the parachute provides a localized restraining force for deceleration of the cargo as well as a moving pivot point in controlling the cargo trajectory. This tethered principle is attractive because it employs the most economical and readily available source of energy, viz., the energy of the mass of air moving past the aircraft, to decelerate the descent of the cargo and thereby reduce its velocity on impact. Unfortunately, this previously developed, tethered principle has several disadvantages. For example, it is very sensitive to altitude, i.e., has high velocity gradients near impact, requiring accurate coordination of aircraft altitude and speed, target area surface, etc. Additionally, the drag forces produced by the parachute are shared both by the aircraft and the payload.

The present invention contemplates an aerial delivery system that incorporates many of the advantages of the tethered principle but differs essentially from this principle to eliminate or substantially reduce its altitude sensitivity. Thus, a payload or cargo becomes deliverable to surface target areas of opportunity or in inaccessible locations without advance preparation of the target area or special packaging of the cargo.

In essence, the instant invention has in view means connecting a drag-producing device, such as a parachute, to the cargo to be delivered in such a way that all of the drag forces acting on the parachute when fully deployed and located in a predetermined position in the wake of the aircraft are applied to the cargo to decelerate it. When such deceleration reaches a predetermined minimum, these drag forces are transferred from the cargo to the connecting line loading it in tension and thereby establishing a path of travel for the cargo. Thus the cargo is restrained against free fall and concurrently moved horizontally by the airstream acting against it whereby its additional deceleration is effected.

More specifically, the system herein proposed consists of a parachute at the end of a line connecting it to the aircraft through appropriate restraining means to control the length of such line. The cargo is carried by movable means mounted on the connecting line medially of its length and engagement means is provided in the connecting line between the cargo and the aircraft to limit the movement of the cargo on the line in the direction toward the aircraft. When the parachute is released from the aircraft, the connecting line is allowed to pay out freely. When it reaches the desired length the drag forces acting on the parachute are applied to the cargo through the engagement means whereby the cargo is extracted from the aircraft. During this phase of operation horizontal velocity of the cargo is rapidly reduced and vertical velocity is essentially that of a free fall.

After a predetermined amount of line is payed out, the restraining means withint he aircraft is brought to a controlled stop and the tension in the line on each side of the cargo is approximately equal. Due to the difference in line slopes together with the forces applied by the airstream, the cargo begins to move or roll toward the parachute thereby continuing to decelerate horizontally. Vertical velocity of the cargo is simultaneously restrained by the taut connecting line on which its weight is fully supported.

Thereafter, when the payload reaches a satisfactory touchdown velocity, the connecting line is allowed to pay out again to extend this period of satisfactory velocity at any time during which it may contact the target area surface without damage. Additional means is provided to release the cargo from the line upon initial contact with the surface. Subsequent to this release the line becomes taut behind the aircraft and the parachute, the line, and the attachments may be retrieved into the aircraft.

With the above and other objects in view as will be apparent, this invention consists in the construction, combination and arrangement of parts all as hereinafter more fully described, claimed and illustrated in the accompanying drawings wherein:

FIGURE 1 is a general schematic view of a delivery sequence for cargo from a carrier of transport aircraft in accordance with the teachings of the invention to show pimarily the effective, predictable projectory thereof from its initial position within the aircraft to its ultimate position in a target area whereby a high degree of accuracy is attained;

FIGURE 2 is a side view of a fragment of the aircraft in the area of its cargo compartment showing the cargo and its delivery apparatus after deployment of the parachute and just prior to the cargo extraction operation;

FIGURE 4 is a side view of the cargo and its carriage in the position in which it leaves the aircraft when the full weight thereof is about to be transferred to the extraction line;

FIGURE 8 is a section taken along line 8—8 of FIGURE 6;

FIGURE 9 is an enlarged view of the parachute illustrated in FIGURE 1 to show reefing and redeploying means associated therewith; and FIGURE 10 is a view similar to FIGURE 9 after operation of the reefing means.

Figure 3:
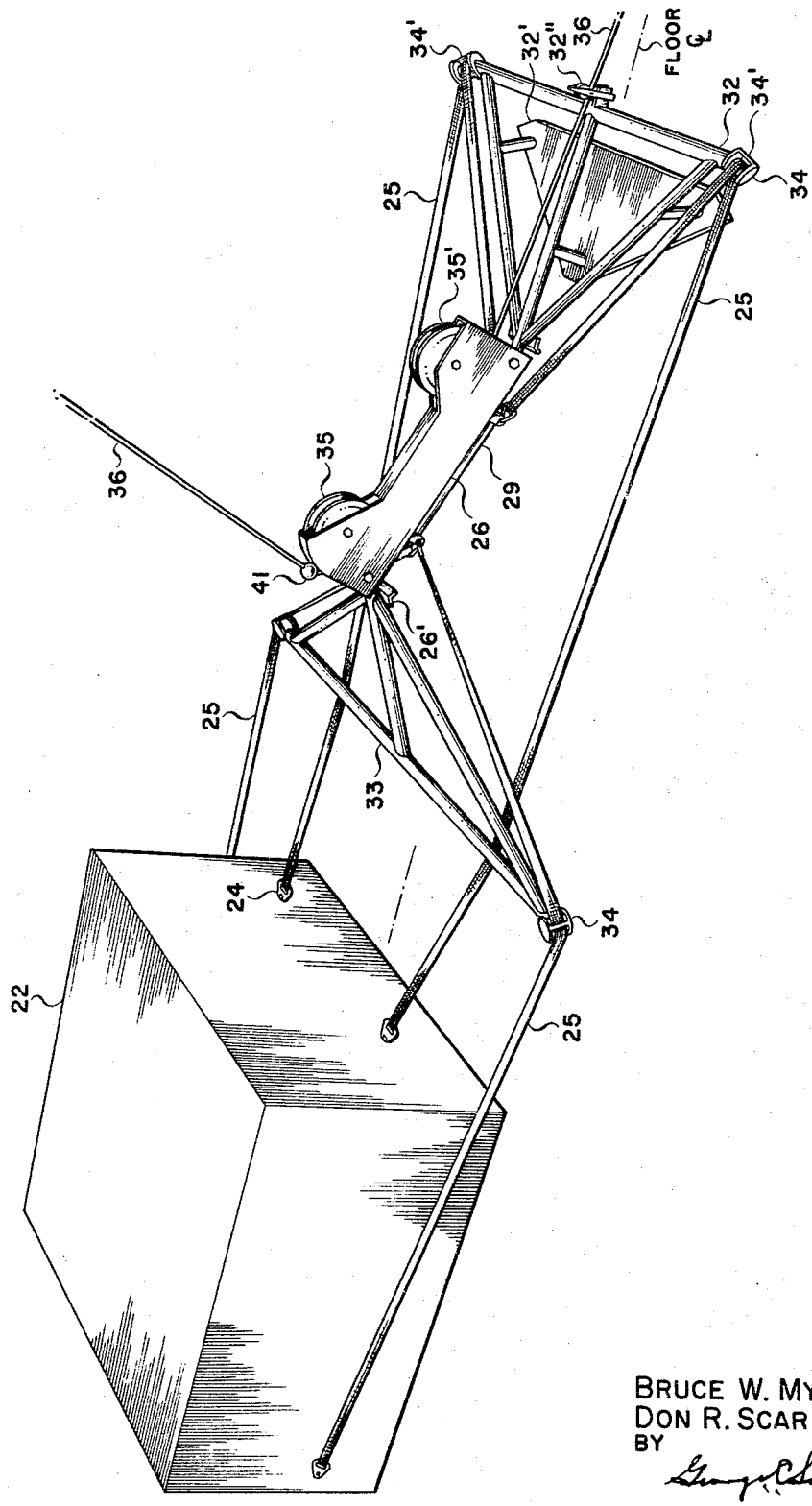
FIGURE 3 is a perspective view of the cargo and its supporting carriage shown in FIGURE 2 at an appreciably larger scale.

Referring more particularly to the drawings, 20 designates a carrier aircraft having a storage compartment 21 for cargo 22 and a loading and unloading opening 23 therein. The cargo 22 is releasably anchored to the aircraft 20 following conventional practice to secure it during shipment and is provided with an appropriate number of fittings 24 and harness straps 25 by which it is connected to a supporting carriage 26.

The carriage 26 is formed by a pair of oblong plates 27 disposed in coextensive, parallel and spaced position and immovably connected one to the other through transverse spacing fasteners 28. A cargo connector, preferably a conventional shackle 29, as commonly employed to carry stores on aircraft, is mounted in fixed position between the plates 27 with the hooks 30 thereof adapted to engage and secure the ends of the several straps 25. The hooks 30 of such shackles 29 are interconnected by a common link for movement in unison through the actuation of a lever or trigger 31.

Adjacent each of its ends the carriage 26 pivotally mounts a frame constituting a harness spreader 32 and 33, each of which is triangular with its apex disposed between the plates 27 and its base adapted to swing freely thereon. Rotation of the spreaders 32 and 33 toward each other is limited by a stop 26' secured to and projecting from each spreader 32 and 33 adjacent its apex and adapted to abut the associated end of the carriage 26. At its outer or base side, each triangular spreader 32 and 33 terminates at opposite ends in a retaining guide 34 around which a strap 25 passes and an overlying keeper 34' whereby the several straps 25 are confined and held taut between the cargo 22 and the carriage 26 at all times. The several straps 25 thereby act on and against the spreaders 32 and 33 in opposition to the stops 26' when the weight of the cargo 22 is imposed thereon during its descent to maintain the spreaders 32 and 33 in the desired position.

Also mounted between the plates 27 adjacent each opposite end of the carriage 26 is a pulley 35 and 35' each adapted to receive and pass a connecting line or cable 36 passing between a parachute 37 and a winch 38. More specifically, the winch 38 is fixedly mounted to structure internally of the aircraft 20 on which the cable 36 is wound. The cable 36 passes from the winch 38 to an overhead support structure 39, through the pulleys 35 and 35' of the carriage 26 and terminates with its connection to the risers of the parachute 37. The winch 38 is of standard design and incorporates a brake 40 for its controlled operation in winding and unwinding the cable 36.

In order to facilitate handling of the carriage 26 and its attachments within the aircraft compartment 21 as well as its ejection therefrom through the opening 23, a supporting plate 32' is mounted on the spreader 32 being adapted to rest on the floor of the compartment and dispose the spreader 32 in a position substantially parallel to the carriage 26 and remote from the spreader 33. Thus disposed cable guiding means in the form of a channeled roller 32" mounted on and projecting from the spreader 32 receives and passes the cable 36 to ensure against interference or entanglement therewith.

The carriage 26 is thereby elevated from the floor of the compartment 21 being suspended at its other end by the cable 36 from the support 39. The plate 32' is generally triangular in shape so as to pass freely between the associated straps 25 and not interfere with the rotation of the spreader 32 about the carriage 26, as described.

Figure 5:
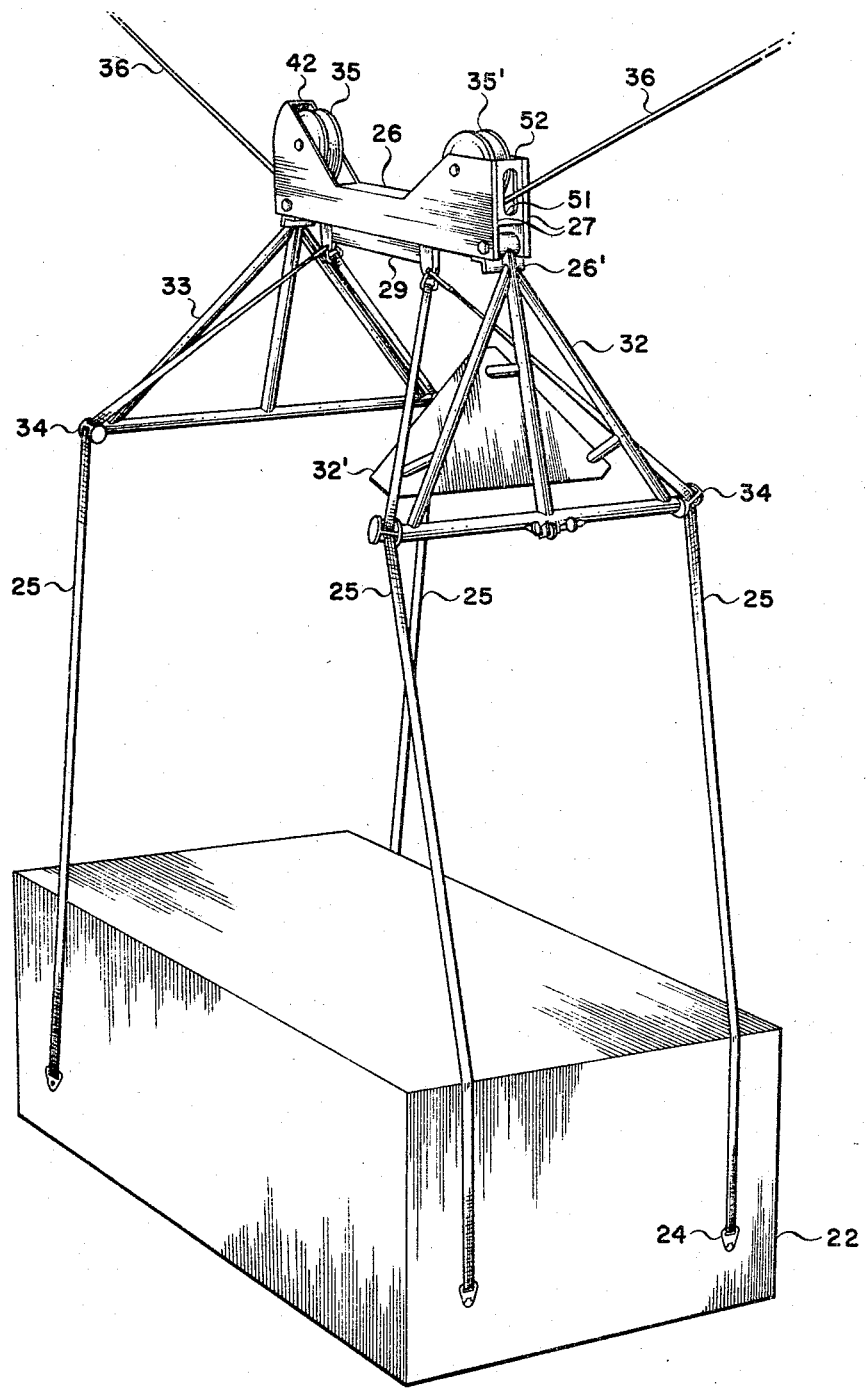
FIGURE 5 is a perspective view of the cargo and its carriage after leaving the aircraft and with its full weight on the extraction line.
Figure 6:
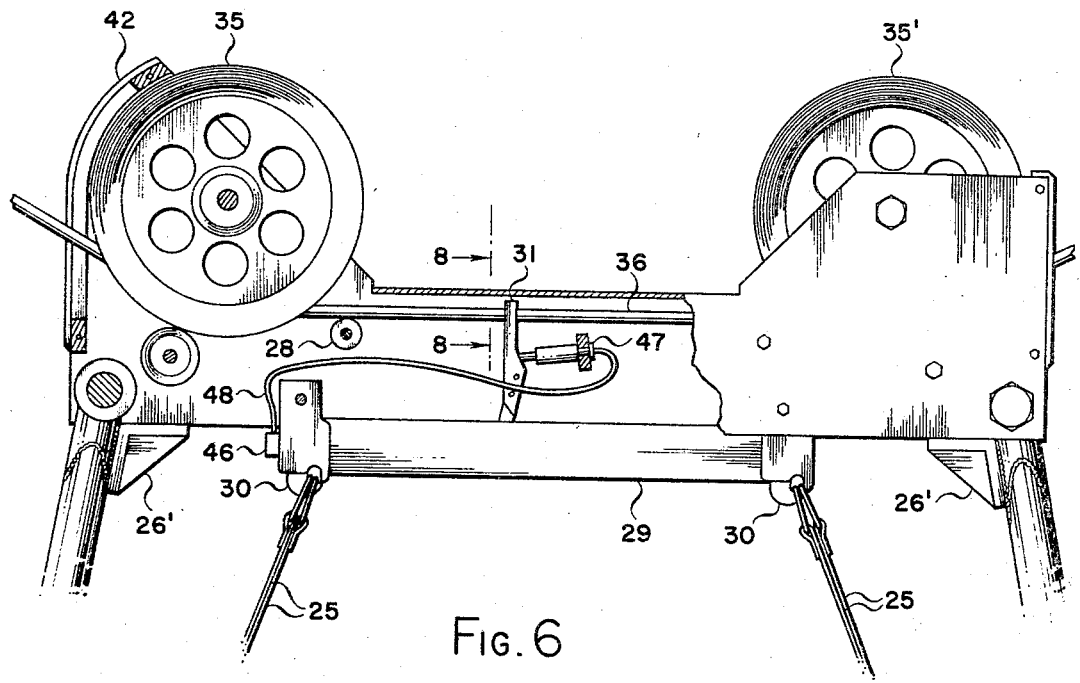
FIGURE 6 is a side elevation of the cargo carriage showing the releasable connectors thereof by which the cargo is attached thereto with parts of the carriage broken away to show actuating means for release of the connectors.
Figure 7:
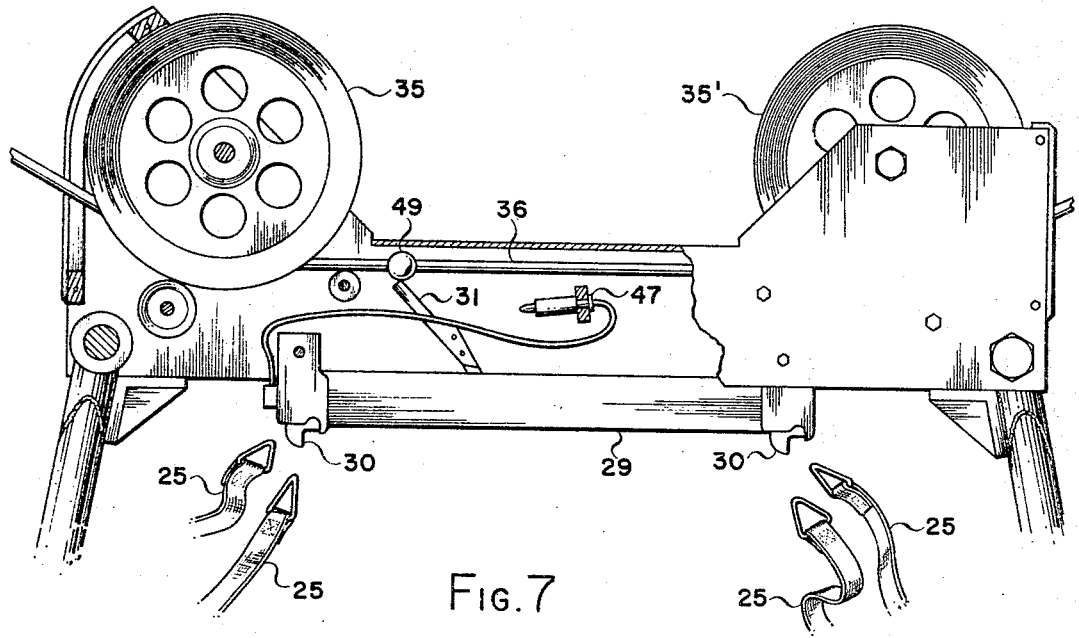
FIGURE 7 is a similar view upon operation of the actuating mechanism for release of the cargo connectors.

When the parachute 37 is ejected from the aircraft 20 through the opening 23 by whatever means and deployed in the airstream, the drag forces acting thereon are applied to the cable 36. Initially, the winch 38 allows the cable 36 to pay out freely under such forces. However, when a predetermined length of cable has payed out an obstruction or stop 41 provided in the line 36 engages the carriage 26 through a cable guard 42 associated with the pulley 35 whereby continued forces exerted by the parachute 37 serve to extract the carriage 26 from the aircraft 20. These forces at this time are applied directly to the cargo 22 which is withdrawn from the compartment 21 swinging about its carriage 26 to the position shown in FIGURE 5 where its full weight is supported by the cable 36.

During this time the winch 38 continues to pay out the cable 36 and as the cargo 22 and parachute 37 slow down, the drag forces acting thereon gradually become insufficient for significant further deceleration of the cargo 22. This has been found to occur after the original horizontal speed of the cargo has been reduced by about 75 percent; its vertical speed has been virtually that of free fall. At this time the brake 38 in the aircraft 20 is applied restraining further line run-out and placing the cable 36 under tension. This action, has the effect of transferring the drag forces of the parachute 37 from direct application to the cargo 22 to producing and maintaining the cable 36 aft of the cargo 22 in an inclined plane 43 due to the mass of the cargo 22, the relative length of the line 36 on opposite sides of the cargo 22, and the altitude of the parachute 37 with reference to the aircraft 20. The cargo 22 is thereby forced up the plane 43 further decelerating its horizontal velocity. At the same time the vertical velocity of the cargo 22 is being reduced by the restraining forces applied thereto because of the tension of the cable 36.

When the vertical velocity of the cargo 22 has thus been reduced to a predetermined level, i.e., below the critical impact velocity as established by the particular cargo (usually within the range of 5 to 25 feet per second for a load in the order of 5,000 pounds), it is maintained at that level or within a relatively short range of that level by partially releasing the brake 40. This permits the winch 38 to pay out more cable 36 at a controlled rate. The cargo 22 may thereafter be placed in contact with a selected target area 44 without sustaining damage.

In view of the foregoing, it should be apparent that the cargo 22 is continuously throughout the delivery sequence engaged, and its movement controlled, by the cable 36. Such control lends itself to the establishment of a predictable trajectory 45 for the cargo 22. This in conjunction with the prolonged period within the tolerable impact velocity range set forth above permits accurate deliveries to the desired area 44.

In order to effect a release of the cargo 22 upon placement in the target area 44, automatic disconnection means is provided in association with the shackle 29. This means includes a sensing unit 46 operatively connected to a surface contacting element (not shown), attached to the under surface of the payload 22. Such disconnection means is well within the state of the art and per se forms no part of the instant invention. The sensor 46 is operatively connected to a pyrotechnic device 47 mounted on the shackle 29 adjacent the trigger 31 by a connector 48 and is responsive to actuation of the surface contacting element upon touchdown of the cargo 22. Operation of the sensor 45 fires the device 47 to forcibly actuate the trigger 31 for rotation of the hooks 30. The several straps 25 are thereby released from the carriage 26 and delivery of the cargo 22 is completed.

As an added measure to ensure the release of the cargo 22, an engagement 49 may be incorporated in the length of the cable 36 to actuate the trigger 31. To this end the trigger 31 terminates outwardly in a fork 50 disposed in the path of the cable 36 where it passes between the pulleys 35 and 35'. This engagement 49 is small enough to pass freely through a slot 51 in an end plate 52 on the carriage 26 between the plates 27 and the groove of the associated pulley 35' but is substantially larger than the space defined by the fork 50. Thus, as the carriage 26 rolls along the plane 43 as described, the engagement or obstruction 49 eventually strikes the trigger 31 for actuation of the hooks 30 in the event that they have not already been actuated by a firing of the device 47, as described.

Subsequent to delivery of the cargo 22 in the above manner, recovery of the cable 36 and its attachments into the aircraft 20 may be effected by reversing the operation of the winch 38. To facilitate this recovery, the parachute 37 is first collapsed or reefed. For this purpose the device illustrated in FIGURES 9 and 10 is provided, it being designed and intended for repeated deployment and reefing operations to satisfy the requirement of multiple deliveries of cargo during a single aircraft flight or mission.

The shroud lines of the parachute 37 are all secured at their respective ends to a retaining collar 53 slidable on the cable 36 which extends beyond the outer limits of the parachute 37 when fully deployed, the parachute being pierced by a central opening 54 for the passage thereof. A plurality of spaced collar stops 55 and parachute stops 56 are secured to this cable 36 outwardly of the collar 53. The first of the collar stops 55 serves to abut the collar 53 upon the initial deployment of the parachute 37, and the first of the parachute stops 56 is at this time in contact with the outer surface of the deployed chute.

The stops 55 are smaller than, for freely passing through, the opening 54, while the parachute stops 56 are each larger than such opening 54. All of these stops 55 and 56 contain cartridges or squibs, as they are commonly called, which are activated or fired in sequence by coded radio signals from the aircraft 20 to separate their respective stops 55 and 56 from the cable 36. Thus, upon completion of the first delivery of cargo 22, the first collar stop 55 is separated from the line 36 allowing the retaining collar 53 to slide down the line to the second collar stop 55. The parachute 37 not being able to pass beyond the first stop 56 is therefore inverted (FIGURE 10).

Prior to the next delivery sequence, the first parachute stop 56 is released from the cable 36 by the second coded radio signal. This allows the parachute 37 to move aft and redeploy, the retaining collar 53 remaining in abutment against the second stop 55. The parachute 37 is thereby reefed and deployed any number of times corresponding to the required deliveries, the final reefing of the parachute 37 being accomplished by a terminal stop 57 at the extremity of the cable 36. This last stop 57 may be a permanent fixture on the cable.

While a particular preferred embodiment of the invention has been hereinabove illustrated and described, it will be obvious to those skilled in the art that various changes and modifications may be made without departing from the invention. It is intended to cover in the appended claims all such modifications and equivalents as fall within the true spirit and scope of this invention.

What is claimed is:

1. An aerial delivery system for cargo from aircraft comprising drag-producing means carried by the aircraft and adapted to be deployed in the airstream, a cable interconnecting said means and said aircraft at all times, means for adjusting the effective length of said cable, a carriage connected to said cargo, cable-engaging means on said carriage facilitating movement of the carriage and its connected cargo on said cable, engagement means operative between said cable and said carriage at a predetermined point in the length of said cable, and a release operative to disconnect said cargo from said carriage at a predetermined time.

2. The system of claim 1 including harness straps interconnecting said cargo to said carriage, and a depending pivotally connected frame adjacent opposite ends of said carriage to receive and retain said straps medially of their length and maintain them taut during relative movement between said cargo and carriage.

3. The system of claim 1 wherein said engagement means includes an obstruction on said cable in opposition to said drag-producing means with reference to said carriage whereby the drag forces acting on said drag-producing means are applied to said carriage when said engagement means is operative as aforesaid.

4. The system of claim 1 wherein said release includes a sensor responsive to signals indicating contact of the cargo with a surface.

5. The system of claim 1 wherein said release includes an obstruction on said cable at a predetermined point in its length between said drag-producing means and said carriage, and an actuator for said release disposed in the path of said obstruction.

6. The system of claim 2 wherein said release includes multiple connectors between said carriage and said harness straps, and an actuator for the disconnection of said connectors in unison.

7. The system of claim 1 including an overhead support carried by said aircraft to receive and pass said cable between its adjusting means aforesaid and one end of said carriage, and a support on said carriage adjacent the other end thereof to dispose it in a predetermined position within the aircraft.

8. The system of claim 7 wherein said cable-engaging means includes an upstanding pulley adjacent each of the carriage ends aforesaid.

9. The system of claim 1 including remotely actuated parachute reefing means operative subsequent to the operation of said release.

10. The system of claim 9 including remotely actuated parachute redeploying means operable subsequent to the operation of said reefing means.

References Cited

UNITED STATES PATENTS 3,096,055   7/1963   Cotton _____ 244—137

MILTON BUCHLER, *Primary Examiner.*

ALFRED E. CORRIGAN, *Examiner.*